United States Patent
Cook et al.

Patent Number: 6,106,754
Date of Patent: *Aug. 22, 2000

[54] METHOD OF MAKING POLISHING PADS

[75] Inventors: Lee Melbourne Cook, Steelville, Pa.; David B. James; Charles William Jenkins, both of Newark, Del.; Heinz F. Reinhardt, Chadds Ford, Pa.; John V. H. Roberts; Raj Raghav Pillai, both of Newark, Del.

[73] Assignee: Rodel Holdings, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/814,514

[22] Filed: Mar. 10, 1997

Related U.S. Application Data

[63] Continuation-in-part of application No. 08/782,717, Jan. 13, 1997, Pat. No. 6,017,265, which is a continuation-in-part of application No. 08/480,166, Jun. 7, 1995, abandoned, which is a division of application No. 08/344,165, Nov. 23, 1994, abandoned.

[51] Int. Cl.[7] ............................. B29C 43/20; B29C 43/52
[52] U.S. Cl. ........................... 264/113; 264/122; 264/126; 51/298; 51/293; 451/56
[58] Field of Search ..................... 264/109, 122, 264/125, 126, 113; 451/56, 41, 527, 530, 537; 51/298, 299, 293

[56] References Cited

U.S. PATENT DOCUMENTS

| | | |
|---|---|---|
| 3,763,054 | 10/1973 | Reischl et al. . |
| 3,917,761 | 11/1975 | Scheverlein et al. . |
| 4,256,845 | 3/1981 | Morris et al. . |
| 4,664,683 | 5/1987 | Degen et al. ........................ 264/122 |
| 4,880,843 | 11/1989 | Stein . |
| 5,019,311 | 5/1991 | Koslow ................................ 264/122 |
| 5,216,843 | 6/1993 | Breivogel et al. .................... 451/56 |

*Primary Examiner*—Jan H. Silbaugh
*Assistant Examiner*—Kenneth M. Jones
*Attorney, Agent, or Firm*—Konrad Kaeding; Kenneth A. Benson

[57] ABSTRACT

A polishing pad having a substantially uniform, continuously interconnected porous surface. The pad can be produced by pressure sintering powder compacts of thermoplastic polymer at a temperature above the glass transition temperature but not exceeding the melting point of the polymer. The sintering process is conducted in a mold at a pressure in excess of 100 psi (0.07 MPa). In a preferred version, a mixture of two polymer powders is used, where one polymer has a lower melting point than the other.

9 Claims, 3 Drawing Sheets

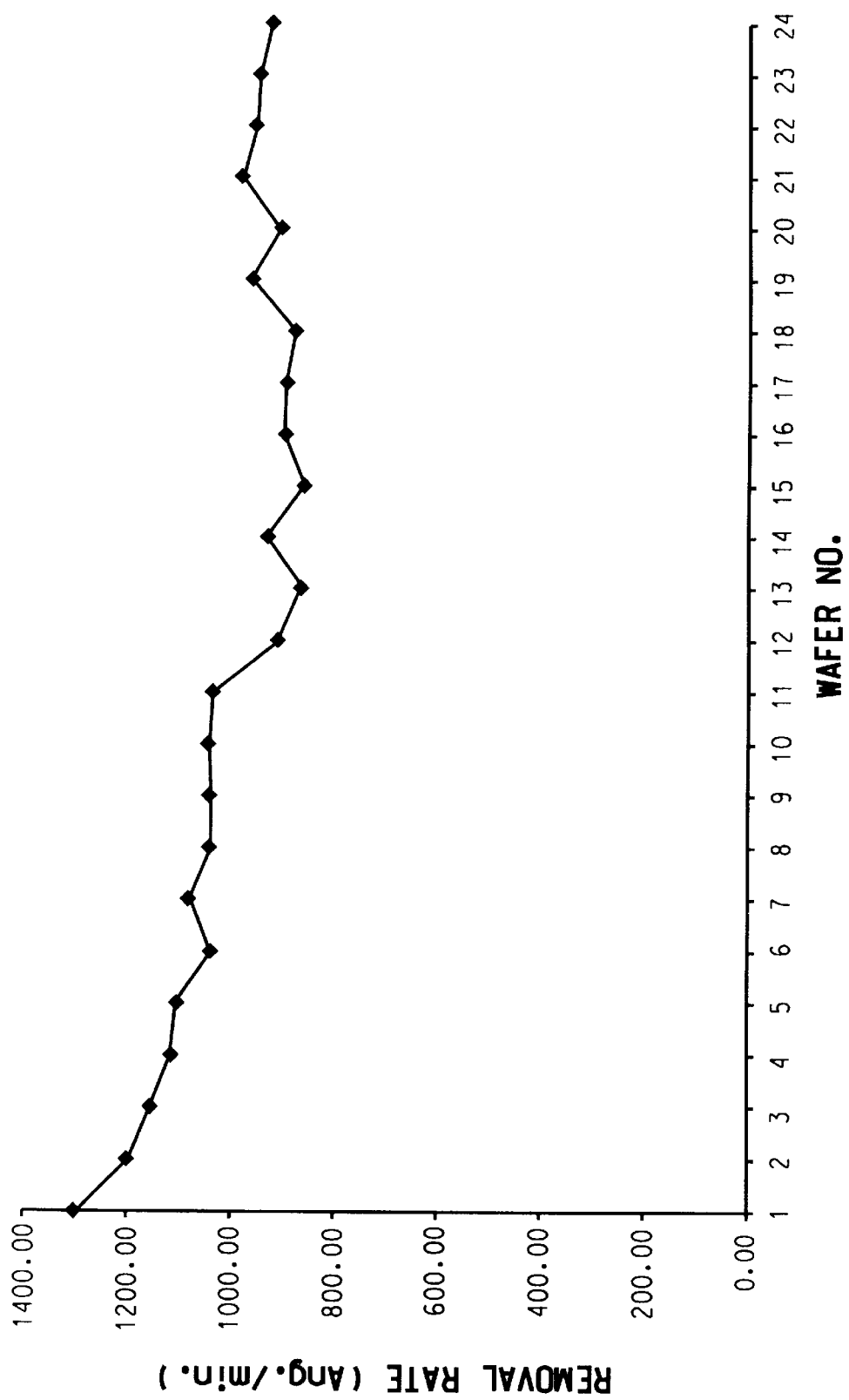

METHOD OF MAKING POLISHING PADS

This application is a continuation-in-part of application Ser. No. 08/782717 U.S. Pat. No. 6,017,265 filed on Jan. 13, 1997, which is a continuation-in-part of application Ser. No. 08/480166 filed Jun. 7, 1995 now abandoned, which is a divisional of application Ser. No. 08/344165 filed on Nov. 23, 1994 now abandoned.

BACKGROUND OF THE INVENTION

1. Field of the Invention

The present invention relates generally to polishing pads which are useful in the polishing of semiconductor wafers, integrated circuits and the like. More specifically, the polishing pads of the present invention are directed to the use of sintered thermoplastic particles to enhance polishing performance.

2. Description of Related Art

U.S. Pat. No. 3,763,054 discloses microporous polyurethane sheeting by melt sintering sheets of loosely bonded particles.

U.S. Pat. No. 3,917,761 discloses a process of preparing porous sintered polyimide articles useful as oil filled bearings.

U.S. Pat. No. 4,256,845 discloses a method for manufacturing a porous thermoplastic sheet by gelling an aqueous latex dispersion of particles and forming the dispersion into a sheet. This sheet is then free-sintered at a temperature at or above the melting point of the thermoplastic to form the final product.

U.S. Pat. No. 4,880,843 discloses a process for preparing a porous molded composite article containing ultra high molecular weight polyethylene and a polyethylene wax. The powder is melt sintered at a temperature in excess of the melting point of the polymer.

SUMMARY OF THE INVENTION

The present invention is directed to polishing pads comprising sintered thermoplastic particles. The particles comprise a thermoplastic material having a critical surface tension greater than or equal to 34 milliNewtons per meter, a modulus of 1 to 200 megaPascals and an elongation to break in the range of 25% to 1000%. The particles are compacted into a mold at a pressure in excess of 100 psi, and the particles are then sintered at a temperature above the glass transition temperature, but preferably below the melting point of the thermoplastic. The mold can define the final pad dimensions, or the polishing pad can be cut from the sintered product.

BRIEF DESCRIPTION OF THE DRAWINGS

FIG. 5 is a graph of workpiece surface removal rate versus time in use for a polishing pad of the present invention.

DESCRIPTION OF THE PREFERRED EMBODIMENTS

Figure 1:
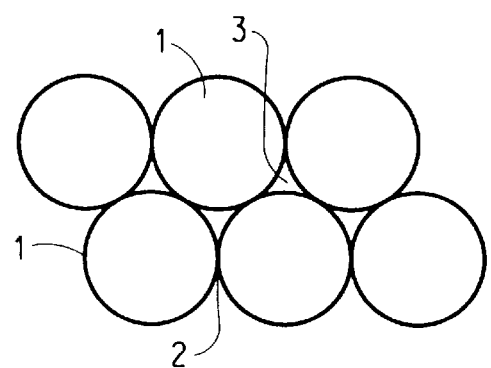
FIG. 1 is a two-dimensional schematic drawing of packed spherical particles.

The present invention is directed to polishing pads derived from high pressure sintering of polymer powders, preferably at a temperature below the polymer's melting point. The sintering is preferably conducted in a precisely shaped mold to provide a non-densified, porous material.

Thermoplastic polymers are generally viscoelastic, and their temperature-viscosity behavior can be complex. Polymer behavior over a wide temperature range can generally be classified into three basic regions. At low temperatures, polymers generally behave as glassy, brittle solids, exhibiting predominantly elastic behavior. The upper temperature boundary for this region is often referred to as the glass transition temperature or "Tg."

Above the Tg, but below the melting point of the polymer, viscous characteristics become more significant, and polymers generally exhibit both viscous and elastic effects. In this region, the polymer is capable of considerable deformation when stress is applied. However, when the stress is removed, complete recovery may not occur, due to permanent movement and rearrangement of the molecular structure of the polymer. Above the melting point, the polymer tends to behave as a viscous liquid, generally exhibiting permanent deformation when stress is applied.

The processes of the present invention are preferably conducted below the melting point of the thermoplastic particulate material employed. Above the melting point of the material, rapid liquid sintering generally makes the process difficult to control, particularly since a precisely regulated and uniform pore structure is preferred. Also above the melting point, thermal gradients tend to cause variations in sintering rate and can cause a non-uniform pore structure in the final article. Furthermore, sintering above the polymer's melt temperature tends to cause: 1. unwanted adhesion between the molten polymer and the mold; and 2. unwanted deformation of the sintered product due to viscous flow.

In a preferred embodiment, the particles are sintered between the glass transition temperature and the melting point of the particle material. Because the spontaneous rate of sintering is relatively low in this temperature range, high pressures are preferably employed to increase the sintering rate in a controllable fashion. Pressure is preferably uniformly transmitted throughout the article to be compacted, so the sintering rate is essentially uniform throughout the bulk of the material. This largely eliminates porosity gradients in the final products, making production of relatively thick articles possible.

By employing a mold or form of precisely pre-determined dimensions as the means of imposing pressure, individual constituent polymer particles are sintered in a precisely defined shape which corresponds to the mold dimensions. This eliminates final shaping steps during manufacture and inhibits deformation of articles during the sintering process. In addition, the lower temperature range largely prevents product deformation and mold adhesion during sintering. Finally, the lower temperatures eliminate or minimize thermal decomposition effects. Oxidative decomposition can generally be prevented by introducing inert gases into the mold prior to and/or during sintering.

Generally speaking, thermoplastics can be readily converted into a powder using conventional techniques, such as, cryogenic milling. The powdered thermoplastics will generally exhibit well defined thermal characteristics, including thermal stability as temperatures approach the thermoplastic's melting point. The thermoplastic material can be selected according to hardness, elastic moduli, chemical durability, and abrasion resistance.

A wide variety of products may be produced using the same manufacturing equipment, simply by changing the process temperatures and pressures. Examples of thermoplastic polymers which might be used in the processes of the present invention are polyurethanes, polyamides, polycarbonates, polyacrylates (including methacrylates and acrylates), polysulfones, and polyesters.

Preferably, at least a portion of the thermoplastic polymers of the present invention are sufficiently hydrophilic to provide a critical surface tension greater than or equal to 34 milliNewtons per meter, more preferably greater than or equal to 37 and most preferably greater than or equal to 40 milliNewtons per meter. Critical surface tension defines the wettability of a solid surface by noting the lowest surface tension a liquid can have and still exhibit a contact angle greater than zero degrees on that solid. Thus, polymers with higher critical surface tensions are more readily wet and are therefore more hydrophilic. Critical Surface Tension of common polymers are provided below:

| Polymer | Critical Surface Tension (mN/m) |
| --- | --- |
| Polytetrafluoroethylene | 19 |
| Polydimethylsiloxane | 24 |
| Silicone Rubber | 24 |
| Polybutadiene | 31 |
| Polyethylene | 31 |
| Polystyrene | 33 |
| Polypropylene | 34 |
| Polyester | 39–42 |
| Polyacrylamide | 35–40 |
| Polyvinyl alcohol | 37 |
| Polymethyl methacrylate | 39 |
| Polyvinyl chloride | 39 |
| Polysulfone | 41 |
| Nylon 6 | 42 |
| Polyurethane | 45 |
| Polycarbonate | 45 |

Preferred thermoplastic powders comprise urethane, carbonate, amide, sulfone, vinyl chloride, acrylate, methacrylate, vinyl alcohol, ester or acrylamide moieties. Useful thermoplastics (from which a powder can be made) in accordance with the present invention have a modulus of 1 to 200 MegaPascal and an elongation to break in the range of 25% to 1000%, more preferably 50%–500% and most preferably 100%–350%.

If mixtures of thermoplastic materials are used, then at least about 20 weight percent of the thermoplastic material is hydrophilic as described above, e.g., provides a critical surface tension greater than or equal to 34 milliNewtons per meter. The different thermoplastic materials can be blended, and powders can be created from the blend. Alternatively, different thermoplastic materials can be made into powders individually and thereafter combined as a blend of dissimilar powders. By combining different thermoplastics, physical properties of the end product can be fine tuned. Some thermoplastics can be chosen to provide improved processability, such as, mold release and suseptability to cutting (i.e., skiving). Other thermoplastics can be chosen to improve pad performance, i.e., improved hydrophilicity, improved elongation to break, improved resistance to plastic flow, etc.

Since the starting material is a powder, the final product will have a substantially continuous bulk porosity. In the processes of the present invention, a premeasured quantity of powdered thermoplastic polymer is poured into a mold and tapped or vibrated to settle the particles. This yields a volume of particles in tangent contact with each other throughout the powder volume. A two-dimensional schematic drawing of this packed state is illustrated in FIG. 1. In the illustration, particles 1 are in tangential contact 2. An interparticle void is shown at 3.

For example, the particles might involve hexagonal close packing of mono-dispersed spherical powder particles, which would provide a theoretical powder density of about 67%. However, many commercially available powders have measurable size variation and are generally not spherical. These differences will lead to a change in the solids density of the powdered compact prior to sintering, relative to the simplest theoretical case.

While any size particle may be employed to produce a pre-sintered compact, the processes of the present invention preferably use particles having an average diameter in the range of 20–100 microns. Such an average diameter range is well suited for complex molds having fine surface detail; such molds can produce a macroscopically smooth final pad surface which is free from large gaps or crevices. This generally improves the mechanical durability of the sintered product and improves the polishing performance of the surface.

As sintering proceeds, plastic flow at the particle boundaries leads to particle coalescence and a corresponding shrinkage of the interparticle void volume. In the present invention, the time and temperature used for sintering at a given applied pressure are specifically controlled so as to retain a fully interconnected void volume, i.e. sintering is not allowed to proceed to completion. Proper settings to achieve a desired sintering density can be determined from trial sinterings within the pressure and temperature limits set forth herein. Pressures in excess of 0.7 MPa are preferred.

The molds employed to produce products of the present invention may be of any size, shape and pattern desired. Critical features of the molds are the dimensional accuracy of the internal surface and the temperature resistance and rigidity of the materials employed. A preferred mold design for controlling final pressure and sintered product thickness, illustrated in FIG. 2, employs a movable top plate 4 and a rigid bottom plate 5 which has a recessed ledge or press stop 6.

Figure 3:
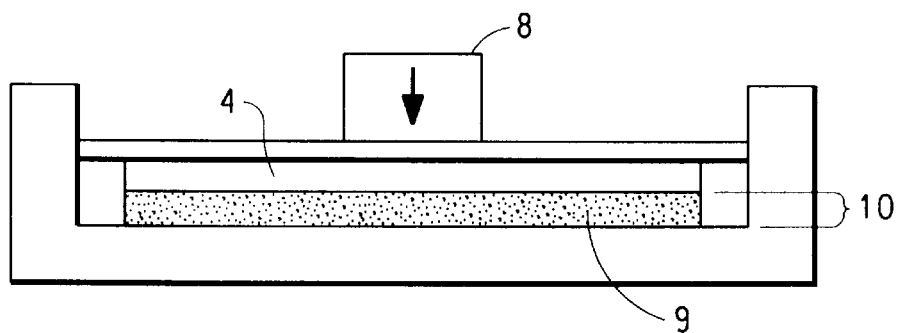
FIG. 3 is a cross-section drawing of the mold of FIG. 2 in the closed position.

In practice, a premeasured quantity of thermoplastic polymer powder is introduced into the bottom mold cavity 5 and tapped or shaken to create a densified powder compact 7. The top plate 4 is then placed on top of the mold, inserted into a constant temperature oven and heated to the desired sintering temperature under pressure, the pressure being applied to the top cover 4 by a piston 8 shown in FIG. 3. As sintering progresses the powder compact volume decreases until the top mold coyer rests on the polishing stop 6. Pressure is retained for the desired length of time, the mold is cooled, and the final part 9 of precisely determined thickness 10 is removed.

Although a wide variety of thermoplastic materials are commercially available and usable as starting materials in the present invention, the range of utility may be considerably enhanced by employing mixtures of two different thermoplastic powders. By intimately mixing two materials, composite structures may be produced which have mechanical properties which may be different than either material individually, and dissimilar material mixtures may be produced from materials which cannot be synthesized directly due to material incompatibility. Of particular utility is the use of a mixture wherein one of the components has a lower melting point than the other. When such a mixture is processed by the present invention at a temperature not to exceed the melting point of the lower melting component, sintering may be effected with significantly less chance of distortion, and is thus preferred.

Particularly preferred combinations of particles include mixtures of particles containing polyurethane with particles containing polyethylene, polypropylene, nylon, polyester or any combination thereof. The polyurethane particles can provide advantageous pad properties (e.g., modulus, elongation to break, critical surface tension, etc.) and the other particles have been found to be particularly useful in improving processability, since sintered polyurethane particles can be difficult to remove from a mold or can be difficult to cut or skive to a desired dimension. In one embodiment, at least about 10 weight percent of the particles comprise polyurethane, more preferably at least about 20 weight percent, yet more preferably at least about 50 weight percent and most preferably at least about 65 weight percent of the particles comprise polyurethane. A preferred particle to be mixed with the polyurethane particles comprises polyethylene.

The distinctive features and advantages of the present invention can be further understood by studying the following examples, which are not meant to be restrictive in any way. Through the study of these examples and the above description, other uses and applications will become apparent to those skilled in the art.

EXAMPLE 1

Samples of several different thermoplastic polymers including polyurethanes (Texin 480A, Texin 455D, Texin 470D and Texin 970D manufactured by Miles Inc., Pittsburgh, Pa., and Isoplast 302 manufactured by Dow Chemical Co., Midland, Mich.)) as well as Nylon 66 were cryogenically milled into powder. The mean particle diameter of the powder was 50 microns. Melting temperatures of the powders were measured using a Fisher-Johns melting point apparatus. Melting point data is given in Table 1.

TABLE 1

Melting points of polymer powders

| Material | Melting point (° C.) |
|---|---|
| Texin 470D | 230 |
| Texin 970D | 210 |
| Isoplast 302 | 200 |
| Texin 455D | 230 |
| Texin 480A | 225 |
| nylon 66 | 260 |

Figure 2:
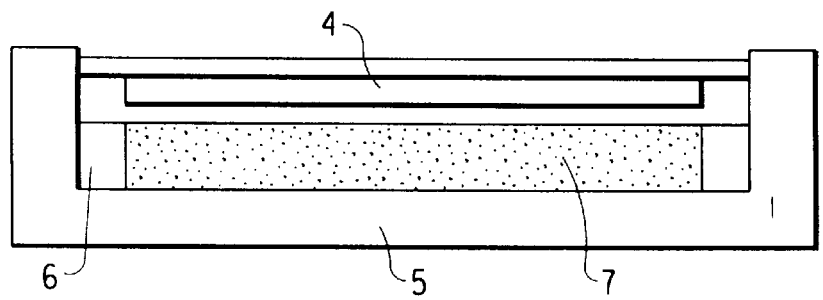
FIG. 2 is a cross-section drawing of a mold in an open position of a type which might be used to form a pad by the process of the present invention.

Sintering tests were conducted on each of these materials at various temperatures using a 12 inch diameter press mold of design shown in FIG. 2. The stop depth selected was 0.062 inches for a total mold depth of 0.125 inches, allowing 2:1 compaction. Dimensional tolerance of the mold cavity was ±0.001 inches. Samples were pressed by first filling the mold cavity with powder in a uniform fashion, gently vibrating the powder, and scraping off excess powder in the mold to ensure that the entire volume of the mold cavity was uniformly filled with starting material.

The top portion of the mold was then placed onto the powder fill and the entire mold assembly placed in a heated press at room temperature and 150 psi (1.03 MPa) pressure applied to the top portion of the mold. The entire assembly was then heated to the desired temperature and held for 20 minutes to effect sintering. At this point pressure was released and the mold removed and allowed to cool to room temperature before removing products for examination.

In all cases, powder pressed at room temperature showed essentially no sintering. Samples pressed at temperatures above the melting point showed nearly complete sintering to a dense non-porous solid. A significant degree of adhesion to the mold was also observed. In contrast, for all materials tested, a temperature range of 175–200° C. yielded a strong resilient sintered product which did not exhibit adhesion to the mold. Examination of products sintered in this region showed a high degree of internal porosity and good interparticle sintering. All products sintered in this temperature range showed good air and water permeability. Sintered pad thickness in all cases was 0.062 inches, exactly corresponding to the mold stop depth. Dimensional variation was ±0.001 inches, again precisely corresponding to the mold surface dimensions and thickness. Surface quality of the products showed them to be extremely smooth and uniform; comparable to commercial polishing pads.

EXAMPLE 2

Several mixtures of plastic powders were processed using the procedure outlined in Example 1. A sintering temperature of 200° C. was employed. Mixtures tested are listed in Table 2 below.

TABLE 2

Powder mixtures used in sintering tests

| Component 1 | Component 2 | Component 3 |
|---|---|---|
| Texin 470D 50% | Isoplast 302 50% | |
| Texin 470D 20% | Isoplast 302 80% | |
| Texin 470D 80% | nylon 66 20% | |
| Texin 470D 50% | Texin 970D 50% | |
| Texin 470D 70% | Polyethylene 30% | |
| Texin 470D 33.33% | Isoplast 302 33.33% | nylon 66 33.33% |

All sintered products showed good flexibility, strength, dimensional precision and porosity, fully equivalent to the best single material samples of Example 1.

EXAMPLE 3

Another top mold plate was prepared which had a series of concentric projecting rings on its inner surface. Ring spacing was 0.030 inches, with a projecting depth of 0.015 inches and a projection width of 0.013 inches. This top plate was substituted for the original top plate and used to sinter samples of 970D powder using optimal conditions identified in Example 1. The resulting product had a top surface which had a pattern of concentric circular grooves of a precise mirror image of the projecting concentric circular grooves of the mold surface. Dimensions and dimensional precision were found to be equivalent to the mold, as in the other examples. All portions of the product, including the regions between grooves on the top surface were of uniform porosity.

EXAMPLE 4

A sintered product pad made from 470D polymer using the procedures outlined in Example 1 was tested for planarization polishing activity and results compared to a commercially available polishing pad, IC1000 (Rodel, Inc.), which is currently widely employed as a planarization pad. Experimental conditions used are given in Table 3 below.

TABLE 3

| Parameter | Setting |
| --- | --- |
| polisher | Strasbaugh 6CA |
| table speed | 100 rpm |
| spindle speed | 60 rpm |
| load | 7 psi |
| slurry used | ILD 1300 silica slurry |
| slurry flow rate | 100 ml/min |
| polish time | 2 minutes |
| pad conditioning | no |
| wafer type | 4 in. diameter thermal oxide on Si |

Figure 4:
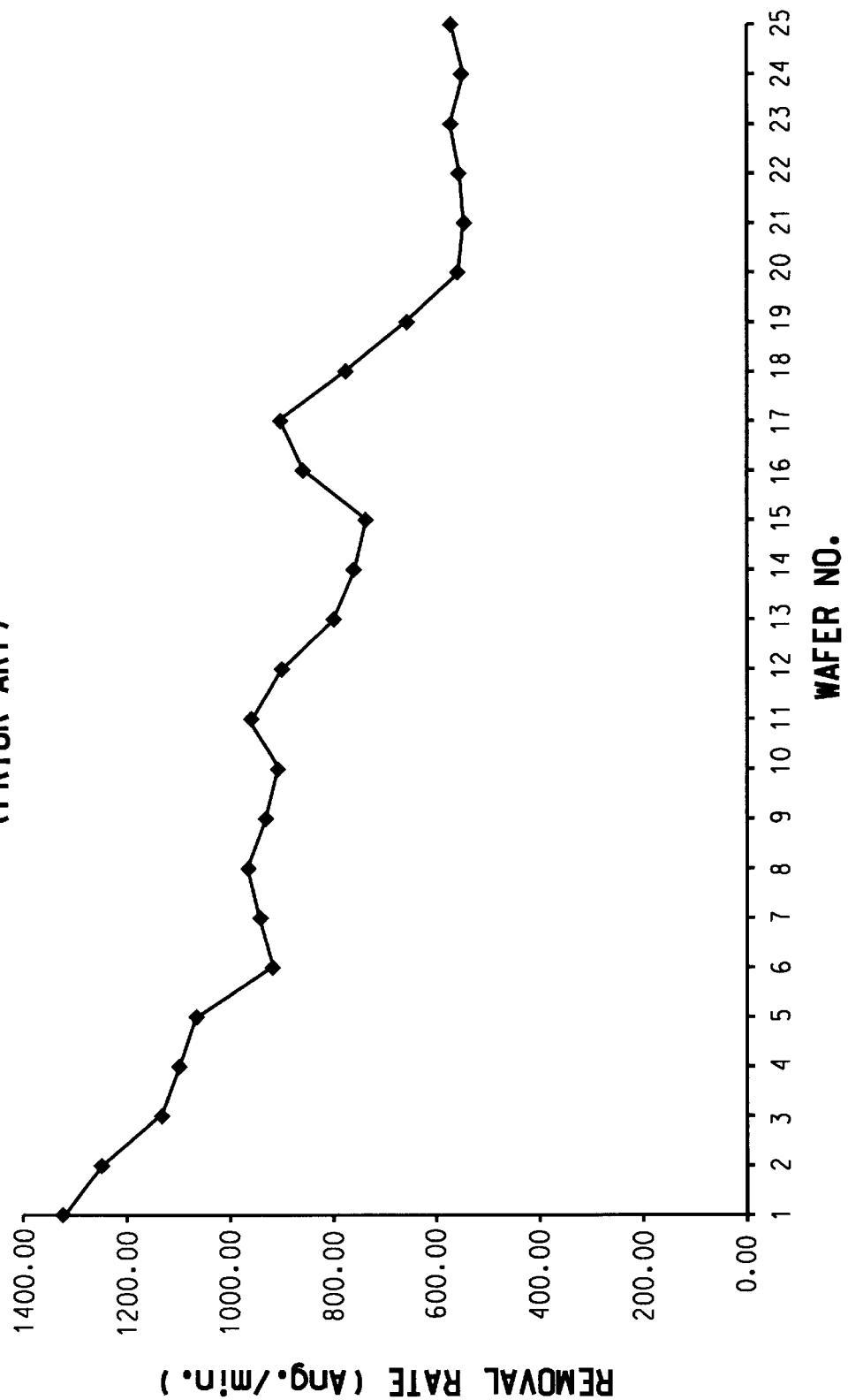
FIG. 4 is a graph of workpiece surface removal rate versus time in use for a polishing pad of the prior art.

The IC1000 pad showed an initially high polishing rate of 1300 Å/min. which decayed steadily to a lower rate of 550 Å/min by the twentieth wafer processed. This is graphically illustrated in FIG. 4. In contrast, the polishing pad of the present invention showed considerably improved rate and rate stability. The initial polishing rate observed was again 1300 Å/min. This decreased to a constant rate of 950 Å/min by the twelfth wafer. This is graphically illustrated in FIG. 5. Thus the pad of the present invention exhibited both significantly increased rate stability and increased rate.

EXAMPLE 5

A sintered product pad made from 455D polymer using the procedures outlined in Example 1 was tested for Silicon polishing activity. Experimental conditions are summarized in Table 4 below.

TABLE 4

| Parameter | Setting |
| --- | --- |
| polisher | Strasbaugh 6CA |
| table speed | 100 rpm |
| spindle speed | 60 rpm |
| load | 7 psi (0.05 MPa) |
| slurry used | Nalco 2350 |
| slurry flow rate | 100 ml/min |
| polish time | 20 minutes |
| wafer type | 4 in. diameter [110] Si |

A series of 25 wafers were polished. Polishing rate was initially 0.4 microns/min, and rapidly increased to a constant value of 0.8 microns/min. The polishing rate obtained was comparable to that obtained using conventional Si polishing pads such as Suba IV (Rodel, Inc.). However, wafer flatness and surface quality as observed by Nomarski microscopy were markedly superior to results obtained with conventional pads.

EXAMPLE 6

In an alternative method of fabrication, a blend of 70 weight parts Texin 470D polyurethane and 30 weight parts polyethylene powders were formed into a cylindrical billet, under carefully controlled conditions of temperature and pressure.

The billet was subsequently skived into a 1.3 mm thick sheet from which a polishing pad was cut. The pad was used to polish silicon wafers. The polishing conditions were:

| Polisher | Strasbaugh 6CA |
| --- | --- |
| Table Speed | 200 rpm |
| Spindle Speed | 80 rpm |
| Load | 48 Pa |
| Slurry | Rodel 1540 |
| Slurry Flow Rate | 180 ml/min |
| Polish Time | 20 min. |
| Wafer | 6 inch diameter silicon |

The pad was initially conditioned for 5 minutes, using a 100 grit diamond conditioning disk. A stable removal rate of 1 micron per minute was achieved without the need for additional conditioning between wafers.

EXAMPLE 7

Sintered compacts of thermoplastic polyurethanes can also be fabricated from aqueous slurries of thermoplastic polyurethane powders. In some cases, small amounts of isopropanol and/or water soluble polymers, such as poly (vinyl alcohol), can be added to improve rheology and the strength of the compact prior to sintering.

Powdered Texin 470D (100 g) was mixed with deionized water (144 g) to give a paste. This was poured into a circular mold and dried at 100° C. for 6 hours. After drying the sample was pressed in the closed mold at 1.03 MPa and sintered at 1 80° C. for 25 min to give a pad having a density of 0.8 g/cm$^3$ and 35% porosity.

EXAMPLE 8

Powdered 470D was mixed with a poly(vinyl alcohol)/water/isopropanol solution to form a paste which was poured into a circular mold as shown in FIG. 2. After drying at 100° C. for 6 hours, the compact was cohesive. The compact was then pressed in the mold at 1.03 MPa and sintered at 185° C. for 25 minutes to give a sintered pad containing 1 wt % poly(vinyl alcohol). The pad appeared to have uniform packing density. Density and porosity were 0.9 g/cm$^3$ and 27% respectively.

What is claimed is:

1. A method for producing a pad for polishing semiconductor wafers or integrated circuits at a polishing rate not in excess of 1 micron per minute, comprising:
   a) providing a powder comprising particles of a thermoplastic polymeric material having an average diameter in the range of 20 to 100 microns,
   b) compacting said powder into a mold at a pressure in excess of 100 psi (0.70 Mpa), and
   c) sintering said powder into said pad having a non-densified porous structure at a temperature above the glass transition temperature of said thermoplastic polymeric material but not to exceed the melting point of said thermoplastic material, at least 20 weight percent of the powder comprising a hydrophilic thermoplastic polymeric material having a critical surface tension greater than or equal to 34 milliNewtons per meter, a modulus of 1 to 200 megaPascals and an elongation to break in the range of 25% to 1000%.

2. A method in accordance with claim 1, wherein said powder comprises a plurality of first particles and a plurality of second particles, the first particles having a melting temperature greater than a melting temperature of the second particles, said sintering being conducted at a temperature above a glass transition temperature of the first or the second particles but not greater than the melting temperature of the first particles, wherein at least one member of a group consisting of the first particles and the second particles comprises a thermoplastic having urethane, carbonate, amide, sulfone, vinyl chloride, acrylate, methacrylate, vinyl alcohol, ester or acrylamide moieties.

3. A method in accordance with claim 2, wherein the first particle comprises a polyurethane and the second particle comprises a member of the group consisting of polyethylene, polypropylene, polyester and combinations thereof.

4. A method in accordance with claim 1, further comprising: compacting a plurality of layers of a thermoplastic polymer powder or a mixture of thermoplastic polymer powders, each of said layers of powders having different mechanical properties, into a mold at a pressure in excess of 100 psi (0.70 MPa).

5. A method for producing a pad useful for polishing according to claim 1, wherein said mold comprises a reverse shape form which provides a texture on a surface of said pad.

6. A method for producing a pad useful for polishing according to claim 1 wherein said thermoplastic polymer is a polyurethane.

7. A method for producing a pad useful for polishing according to claim 1 wherein said thermoplastic polymer is a polyamide.

8. A method in accordance with claim 1 further comprising:

c) after sintering the particles into a sintered product, cutting the sintered product to produce a polishing pad.

9. A method for producing a pad for polishing semiconductor wafers or integrated circuits at a polishing rate not in excess of 1 micron per minute, comprising:

a) providing a powder consisting essentially of particles of a thermoplastic polymeric material having an average diameter in the range of 20 to 100 microns, b) compacting said powder into a mold at a pressure in excess of 100 psi (0.70 Mpa), and c) sintering said powder into said pad having a non-densified porous structure at a temperature above the glass transition temperature of said thermoplastic polymeric material but not to exceed the melting point of said thermoplastic polymeric material, at least 20 weight percent of the powder comprising a hydrophilic thermoplastic polymeric material having a critical surface tension greater than or equal to 34 milliNewtons per meter, a modulus of 1 to 200 megaPascals and an elongation to break in the range of 25% to 1000%.

* * * * *